United States Patent Office 3,034,974
Patented May 15, 1962

3,034,974
POLYSACCHARIDE EXTRACTION BY IRRADIATION
John R. Lowry, White Plains, N.Y., assignor to General Foods Corporation, White Plains, N.Y., a corporation of Delaware
No Drawing. Filed Jan. 28, 1958, Ser. No. 711,555
6 Claims. (Cl. 204—158)

This invention relates to a process for extracting gelatinous polysaccharides from naturally occurring materials in which they are found. More specifically, it relates to a process for extracting these materials at a faster rate to yield products characterized by superior physical properties.

As is well known to those skilled-in-the-art, gelatinous polysaccharides include a wide variety of materials such as natural gums and vegetable mucilates. Typical of these are acacia, karaya, tragacanth, agar-agar, locust kernel, locust bean, etc. The most common of the gelatinous polysaccharides are pectin and alginic acid. These gelatinous polysaccharides are characterized by a chemical configuration containing a linkage of several monosaccharide units as is well known; and they are referred to as gelatinous because of this ability to yield, after contact with water, a sticky mass possessing an apparent Bloom—resembling somewhat that obtained from the protein, gelatin.

These gelatinous polysaccharides are typically prepared by extraction from certain naturally occurring precursor-containing materials, e.g. various plants and trees, including exudates therefrom; seaweeds, including extracts therefrom; seeds or their extracts; and fruits and vegetables or their extracts. These materials, which will be referred to as precursor-containing materials, contain the polysaccharide either as such or in the form of a precursor which upon extraction is converted to the gelatinous polysaccharide. Extraction of polysaccharides, which includes the chemical conversion of precursors to polysaccharides, is commonly effected by maintaining the raw material in contact with an aqueous extraction liquor at appropriate pH, temperature, etc., for proper time.

As is well known to those skilled-in-the-art, extraction of the noted materials, typified for example by pectin or alginic acid, is a process characterized by contact of liquor with raw material for extended times and/or at high temperatures to give a low yield of a very dilute extract solution requiring a high degree of concentrating. Furthermore in most instances, if not given particularly careful treatment, the product readily deteriorates in grade. Deterioration and/or loss of product is accelerated if attempts are made to increase either the yield of the product or the concentration of the extract solution.

It is an object of this invention to provide a process for extracting gelatinous polysaccharides from raw materials in shorter time and at higher yields. It is another object of this invention to obtain gelatinous polysaccharides having improved physical properties. Other objects will be apparent to those skilled-in-the-art on inspection of this specification.

According to certain aspects of this invention, a gelatinous polysaccharide characterized by improved physical properties may be prepared by irradiating a precursor-containing material and extracting the gelatinous polysaccharide from the irradiated precursor-containing material.

In the practice of the invention, the precursor-containing materials may be treated in any form. It is preferred, however, to irradiate the material in substantially dry form, i.e. superficially dry form. In the extraction of pectin from e.g. orange peel, it is preferred either to irradiate the whole orange or the orange which has been freed of juice. In the extraction of alginic acid from seaweed, it is preferred to irradiate seaweed which may have been sun-dried.

The ionizing penetrating radiation which can be employed to give the desired product of this invention includes beta and gamma rays. Beta rays include cathode rays, the former term being the common designation when the rays originate from a naturally or artifically radioactive source, while the latter designation is commonly employed to indicate rays produced in an electrical apparatus e.g. of the vacuum tube type.

The term gamma rays as used herein is intended to include therewithin X-rays. The term "gamma" is commonly employed when the rays originate from a naturally or artificially radioactive source, while the term "X-ray" is commonly used when the rays are continuously produced by electron bombardment of suitable targets in an appropriate apparatus.

The ionizing penetrating radiation which can be used in the process of this invention is that having an energy up to about 15 mev. When the preferred type of radiation, i.e. gamma radiation including X-radiation, is employed, the energy thereof will typically fall in the range of $10^{-3}$ mev. up to about 4.0 mev. Typically the wave length of the preferred gamma radiations will be within the range of 0.001 up to about 14 Angstrom units; the frequency may range from about $10^{17}$ up to about $10^{21}$ per second.

It has been found that gamma rays emitted by radioactive atoms, particularly atoms which have been artificially rendered radioactive by bombardment thereof with e.g. neutrons, are particularly suitable for use in connection with this invention. When gamma radiation from such a source is used, the preferred energy ranges of the gamma particles are those falling within the range of $8.8 \times 10^{-3}$ mev. up to 4.0 mev. The wave length of these gamma rays is 0.001 Angstrom units to about 14 Angstrom units. The frequencies may range from e.g. $10^{17}$ up to $10^{21}$ per second.

Cobalt-60 is prepared e.g. by irradiating normal cobalt of atomic weight 59 in a uranium pile wherein neutrons are present. As a neutron strikes an atom of cobalt-59, it forms the artificially radioactive cobalt-60 which emits gamma radiation having an energy of 1.1 and 1.3 mev. The half-life of cobalt-60 is 5.3 years.

Irradiation of the precursor-containing material may be effected by passing the material through the radiation beam. The distance between the radiation source and the material being irradiated may vary, but typically it will be of the order of from 1 inch to about 18 inches. Under these conditions irradiation may occur for a period ranging from about 5 seconds up to as long as 8 hours. In the case of beta radiation, the time may be as little as 5 seconds, and the preferred maximum will not be above 15 minutes. In the case of gamma radiation, the preferred range is 15 minutes to 3 hours, with best results being obtained after about 3 hours. The amount of irradiation to which the material is subjected is measured in terms of the rep. (Roentgen equivalent physical). A rep. is a measure of the amount of radiation falling on a particular material, and is measured by determining the effect upon a standard such as the commonly used methylene blue or iron sulfate indicator, located immediately adjacent to the sample being irradiated. At the conclusion of the radiation experiment, the number of rep.'s supplied can be determined by comparing the irradiated methylene blue with a standard non-irradiated methylene blue or iron sulfate sample.

Although some improvement is observed at radiation dosages of less than $0.5 \times 10^6$ rep., the preferred dosage range is $0.5$–$4.0 \times 10^6$ rep. As the dosage is increased above $4.0 \times 10^6$ rep., the additional improvement which is obtained is slight.

The temperature at which radiation is effected may vary; preferably it will be effected at ambient temperatures. No special temperature conditioning of the stock need be provided.

The precursor material containing the gelatinous polysaccharide is then subjected to extraction. The particular details of extraction (including pretreatment) will vary depending on the particular material which has been irradiated and the polysaccharide being extracted. In general, however, it will be observed that in comparison to a non-irradiated but otherwise corresponding technique, the rate of extraction is faster, the yield is greater, the concentration of extract is higher, the quality of the product is better, and the physical properties are better.

The improved features of this invention may be readily appreciated from the following examples which are illustrative:

EXAMPLE I.—PECTIN

Whole Valencia oranges were irradiated with gamma rays from a cobalt-60, gamma ray, source until the dosage was $2 \times 10^6$ rep. The peel was separated from the orange, cut into small pieces, and subjected to extraction by contact with water which was heated to 77° C. and maintained at that temperature for 30 minutes. The extract was then filtered and ethanol was added to precipitate the pectin. A similar treatment was given to a non-irradiated orange peel. During the extraction, equal aliquots of liquid were removed from the extraction operation at 0, 10, 20, and 30 minutes after the liquor had reached 77° C. The results of this example are noted in Table I.

*Table I*

| Time | Pectin Content, Grams | |
|---|---|---|
| | Control | Irradiated |
| 0 minutes | 0.45 | 3.5 |
| 10 minutes | 2.2 | 7.2 |
| 20 minutes | 2.8 | 4.0 |
| 30 minutes | 1.55 | 4.2 |
| Total Extracted | 7.00 | 18.9 |

From this table it may be noted that: (a) the initial rate of extraction and amount of pectin recovered from the irradiated sample were about 8 times as great as that recovered from the control; and (b) the total amount of pectin extracted from the irradiated sample was substantially greater than that extracted from the control.

It was also noted during the extraction, that the pectin initially recovered from the irradiated sample was better than that recovered at the end of the experiment. In the case of the control, the initial pectin recovered was degraded while a satisfactory product was not obtained until the fourth aliquot (i.e. at 30 minutes).

The total yield of pectin from the irradiated sample was almost three times that extracted from the control, non-irradiated sample.

EXAMPLE II.—ALGINIC ACID

A 100 gram sample of laminaria digitata seaweed was irradiated in superficially dry form from a cobalt-60, gamma ray, source until the dosage was $2 \times 10^6$ rep. The irradiated seaweed was cut into small pieces, washed three times with water, and digested at room temperature, with occasional stirring, in 2.5 liters of water containing 10 grams of sodium carbonate. A control, non-irradiated sample was similarly treated.

After 1, 3, 5, and 24 hours, 250 milliliter aliquots were withdrawn and centrifuged at 1600 r.p.m. for 20 minutes. The supernatant liquor was filtered and samples were brought to constant temperature (63° C.) in a water bath. Viscosity and total solids content of the liquors were determined as set forth in Tables II and III.

*Table II*

| Digestion Time | Viscosity (millipoise corrected to 1.5% concentration) | |
|---|---|---|
| | Control | Irradiated |
| 1 hour | 18.76 | 54.82 |
| 3 hours | 21.34 | 61.82 |
| 5 hours | 21.50 | 70.60 |
| 24 hours | 67.92 | 115.02 |

*Table III*

| Digestion Time | Solids Content | |
|---|---|---|
| | Control | Irridaated |
| 1 hour | 0.78 | 1.36 |
| 3 hours | 0.88 | 1.51 |
| 5 hours | 0.95 | 1.58 |
| 24 hours | 1.54 | 1.92 |

From Tables II and III the following conclusions may be drawn: (a) that the initial rate of extraction from the irradiated seaweed is almost double that of the non-irradiated sample; (b) that the viscosity and solids content of the irradiated extract is substantially higher at any time than is the corresponding viscosity and solids content of the control; (c) that the viscosity of the irradiated extract is 2–3.5 times higher than is the viscosity of the control; (d) that the viscosity and solids content of the irradiated extract after 5 hours are better, i.e. higher, than the viscosity and solids content of the extract from the non-irradiated control after 24 hours; and (e) that if the extraction be continued for the full 24 hours, the viscosity and solids content of the alginic acid from the irradiated sample are substantially higher than the corresponding maximum values of the control.

It is thus a particular feature of this invention that gelatinous polysaccharides may be extracted from their precursors at faster rate and in greater yield than has heretofore been possible.

What is claimed is:

1. The method of extracting a gelatinous polysaccharide from a precursor-containing material which comprises irradiating the precursor-containing material with ionizing penetrating radiation having an energy of at least $10^{-3}$ mev. at a dose of $0.5–4 \times 10^6$ rep. and extracting the said gelatinous polysaccharide from the said irradiated precursor-containing material.

2. The method of extracting a gelatinous polysaccharide from a precursor-containing material which comprises irradiating the precursor-containing material with gamma radiation from cobalt-60 at a dose of $0.5–4.0 \times 10^6$ rep. and extracting the said gelatinous polysaccharide from the said irradiated precursor-containing material.

3. The method of extracting pectin from a precursor-containing material which comprises irradiating the precursor-containing material with ionizing penetrating radiation having an energy of at least $10^{-3}$ mev. at a dose of $0.5–4.0 \times 10^6$ rep. and extracting the said pectin from the said irradiated precursor-containing material.

4. The method of extracting pectin as claimed in claim 3 wherein the precursor-containing material is orange peel.

5. The method of extracting alginic acid from a precursor-containing material which comprises irradiating the precursor-containing material with ionizing penetrating radiation having an energy of at least $10^{-3}$ mev. at a dose of $0.5-4.0 \times 10^6$ rep. and extracting the said alginic acid from the said irradiated precursor-containing material.

6. The method of extracting alginic acid as claimed in claim 5 wherein the precursor-containing material is *Laminaria digitata* seaweed.

References Cited in the file of this patent

UNITED STATES PATENTS

| | | |
|---|---|---|
| 2,548,895 | Graham et al. | Apr. 17, 1951 |
| 2,577,232 | Cole | Dec. 4, 1951 |

OTHER REFERENCES

Saeman et al.: "Ind. and Eng. Chem.," vol. 44, pages 2848–2851, December 1952.

Wright: "Chem. and Ind.," pages 1026–1031, August 13, 1955.

Glegg et al.: "Radiation Research," vol. 5, pages 127–133, August 1956.

Kertesz et al.: "Radiation Research," vol. 5, pages 372–381, October 1956.

Bovey: "Effects of Ionizing Radiation on Natural and Synthetic High Polymers," pages 189–204.